(12) United States Patent
Nagaraja et al.

(10) Patent No.: US 10,834,733 B2
(45) Date of Patent: *Nov. 10, 2020

(54) MASK FOR REFERENCE SIGNAL MEASUREMENTS

(71) Applicant: QUALCOMM Incorporated, San Diego, CA (US)

(72) Inventors: Sumeeth Nagaraja, San Diego, CA (US); Tao Luo, San Diego, CA (US); Sony Akkarakaran, Poway, CA (US); Makesh Pravin John Wilson, San Diego, CA (US); Kaushik Chakraborty, San Diego, CA (US); Xiao feng Wang, San Diego, CA (US); Shengbo Chen, San Diego, CA (US); Wooseok Nam, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/874,575

(22) Filed: Jan. 18, 2018

(65) Prior Publication Data

US 2018/0220431 A1 Aug. 2, 2018

Related U.S. Application Data

(60) Provisional application No. 62/453,440, filed on Feb. 1, 2017.

(51) Int. Cl.
*H04W 72/08* (2009.01)
*H04L 5/00* (2006.01)
(Continued)

(52) U.S. Cl.
CPC ........ *H04W 72/085* (2013.01); *H04B 7/0404* (2013.01); *H04B 7/0408* (2013.01);
(Continued)

(58) Field of Classification Search
None
See application file for complete search history.

(56) References Cited

U.S. PATENT DOCUMENTS

| 2015/0304868 | A1* | 10/2015 | Yu ..................... H04W 56/001 370/312 |
| 2017/0208494 | A1* | 7/2017 | Moon .................. H04W 24/10 |

(Continued)

OTHER PUBLICATIONS

Nagaraja et al., Assisting a user equipment (UE) in reference signal measurements based on measruement report, U.S. Appl. No. 16/666,036, filed Oct. 28, 2019 (Year: 2019).*

(Continued)

*Primary Examiner* — Jutai Kao
(74) *Attorney, Agent, or Firm* — Qualcomm Incorporated

(57) ABSTRACT

Aspects of the present disclosure provide a method, a computer-readable medium, and an apparatus for wireless communication, for example for reference signal measurements. An example method, performed by a user equipment, generally includes determining a duration for reference signal measurements of a network entity and beamforming one or more radio frequency chains in one or more directions for the reference signal measurements of the network entity during the duration.

28 Claims, 10 Drawing Sheets

(51) Int. Cl.
*H04W 72/00* (2009.01)
*H04B 7/0408* (2017.01)
*H04B 7/0404* (2017.01)
*H04B 7/06* (2006.01)
*H04B 7/08* (2006.01)
*H04W 56/00* (2009.01)

(52) U.S. Cl.
CPC .......... *H04B 7/0617* (2013.01); *H04B 7/086* (2013.01); *H04L 5/005* (2013.01); *H04L 5/0023* (2013.01); *H04L 5/0051* (2013.01); *H04W 72/005* (2013.01); *H04B 7/0628* (2013.01); *H04L 5/0053* (2013.01); *H04W 56/001* (2013.01)

(56) References Cited

U.S. PATENT DOCUMENTS

| 2018/0192404 | A1* | 7/2018 | Maaref | H04L 5/0094 |
| 2019/0098523 | A1* | 3/2019 | Muruganathan | H04L 5/005 |
| 2019/0104549 | A1* | 4/2019 | Deng | H04B 7/0617 |

OTHER PUBLICATIONS

International Search Report and Written Opinion—PCT/US2018/014484—ISA/EPO—dated Jun. 11, 2018 15 pages.
Samsung: "Consideration on UE capability in CA scenario", 3GPP Draft; R4-101840, 3rd generation Partnership Project (3GPP), Mobile Competence Centre; 650, Route Des Lucioles; F-06921 Sophia-Antipolis Cedex; France, vol. RAN WG4, No. Montreal, Canada, May 20, 2010 (May 20, 2010), XP050426822, pp. 4.

* cited by examiner

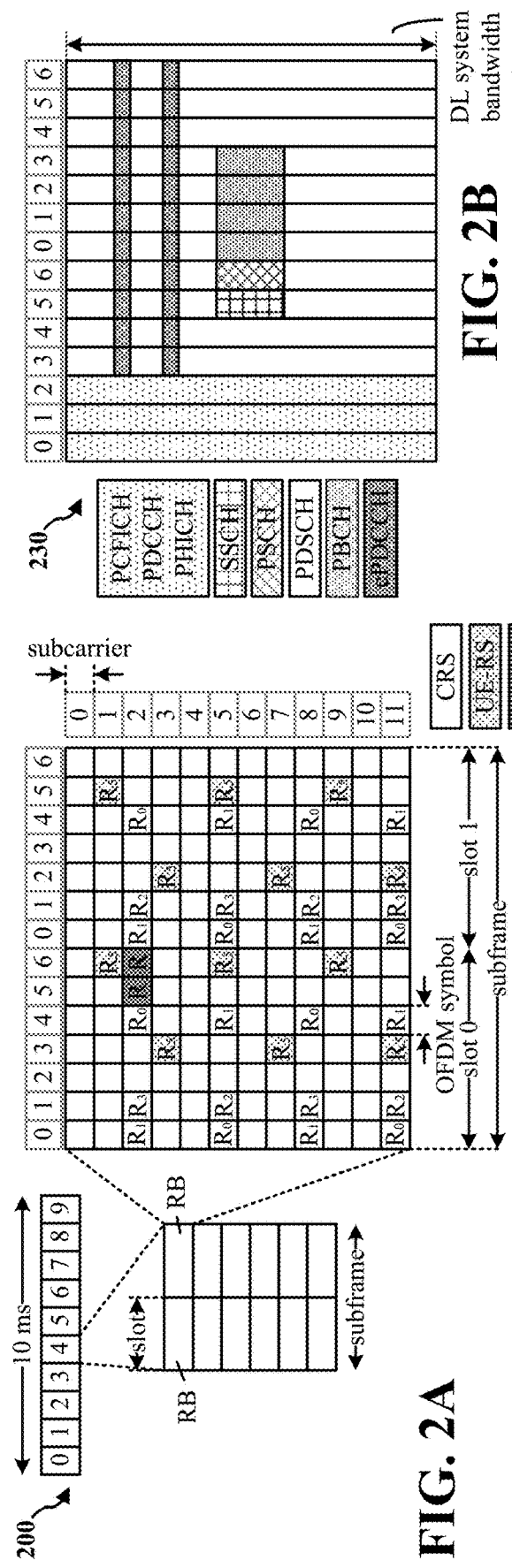
FIG. 2A
FIG. 2B
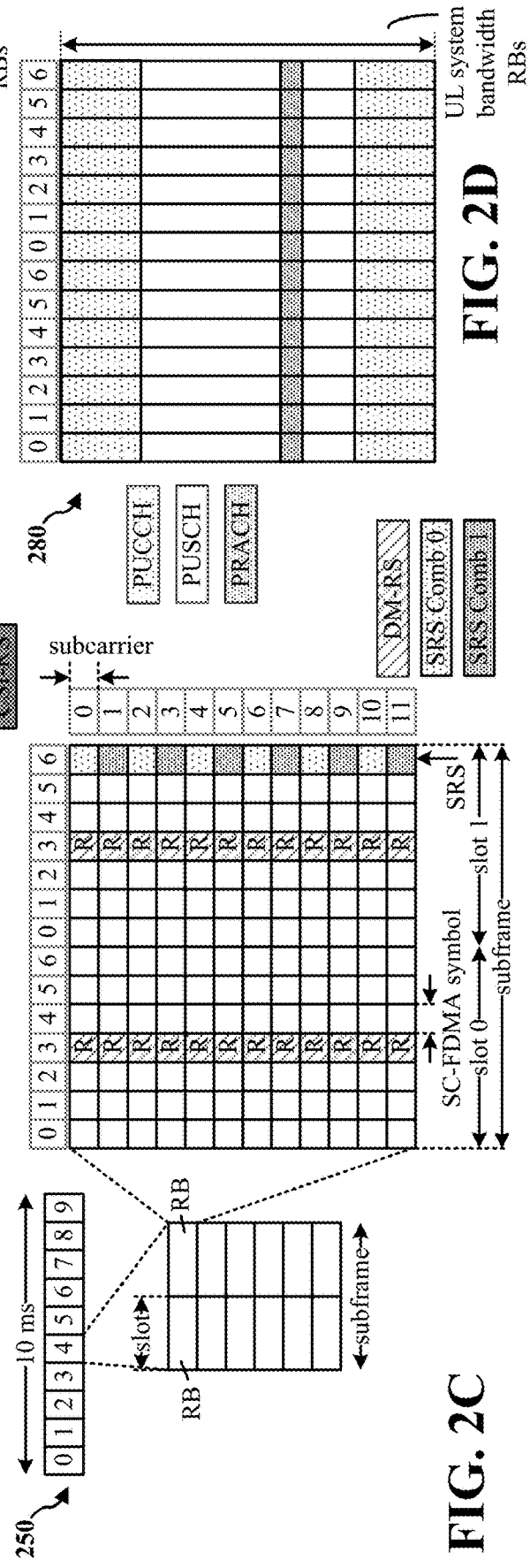
FIG. 2C
FIG. 2D

MASK FOR REFERENCE SIGNAL MEASUREMENTS

CROSS-REFERENCE TO RELATED APPLICATIONS

This application claims benefit of U.S. Provisional Application Ser. No. 62/453,440, entitled "MASK FOR REFERENCE SIGNAL MEASUREMENTS" filed on Feb. 1, 2017 which is expressly incorporated by reference herein in its entirety.

BACKGROUND

The present disclosure relates generally to communication systems, and more particularly, to reference signal (RS) measurements.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A serving base station or network entity may send a measurement request to a UE. Due to analog beamforming and RF chain constraints, the UE may have to tune to a different direction and/or use all RF chains for measurements. During this period, the serving base station may not be able to allocate resources to the UE, resulting in lower throughput.

In an aspect of the disclosure, a method for wireless communication is provided. The method may include determining a duration for reference signal measurements of a network entity. The method may include beamforming one or more radio frequency chains in one or more directions for the reference signal measurements of the network entity during the duration. The method may further include performing the reference signal measurements using the one or more beamformed radio frequency chains.

In another aspect, an apparatus for wireless communication includes a memory, and at least one processor coupled to the memory. The at least one processor may be configured to determine a duration for reference signal measurements of a network entity. The at least one processor may further be configured to beamform one or more radio frequency chains in one or more directions for the reference signal measurements of the network entity during the duration. The at least one processor may further be configured to perform the reference signal measurements using the one or more beamformed radio frequency chains.

In another aspect of the disclosure, an apparatus for wireless communication is provided. The apparatus may be a UE. The apparatus may include means for determining a duration for reference signal measurements of a network entity. The apparatus may further include means for beamforming one or more radio frequency chains in one or more directions for the reference signal measurements of the network entity during the duration. The apparatus may further include means for performing the reference signal measurements using the one or more beamformed radio frequency chains In another aspect of the disclosure, a computer-readable medium storing computer executable code is provided. The computer-readable medium may include code to determine a duration for reference signal measurements of a network entity. The computer-readable medium may further include code to beamform one or more radio frequency chains in one or more directions for the reference signal measurements of the network entity during the duration. The computer-readable medium may further include code to perform the reference signal measurements using the one or more beamformed radio frequency chains.

In another aspect of the disclosure, a method for wireless communication at a first base station is provided. The method may include sending a request for reference signal measurements of a second network entity to a UE. The method may include determining a duration over which the UE performs the reference signal measurements of the second network entity. The method may further include communicating with the UE during the duration.

In another aspect of the disclosure, an apparatus for wireless communication at a first network entity includes a memory, and at least one processor coupled to the memory. The at least one processor may be configured to send a request for reference signal measurements of a second network entity to a UE. The at least one processor may be configured to determine a duration over which the UE performs the reference signal measurements of the second network entity. The at least one processor may be configured to communicate with the UE during the duration.

In another aspect of the disclosure, an apparatus for wireless communication is provided. The apparatus may be a first base station. The apparatus may include means for sending a request for reference signal measurements of a second network entity to a UE. The apparatus may include means for determining a duration over which the UE performs the reference signal measurements of the second network entity. The apparatus may further include means for communicating with the UE during the duration.

In another aspect of the disclosure, a computer-readable medium storing computer executable code at a first network entity is provided. The computer-readable medium may include code to send a request for reference signal measurements of a second network entity to a UE. The computer-readable medium may include code to determine a duration over which the UE performs the reference signal measurements of the second network entity. The computer-readable medium may include code to communicate with the UE during the duration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
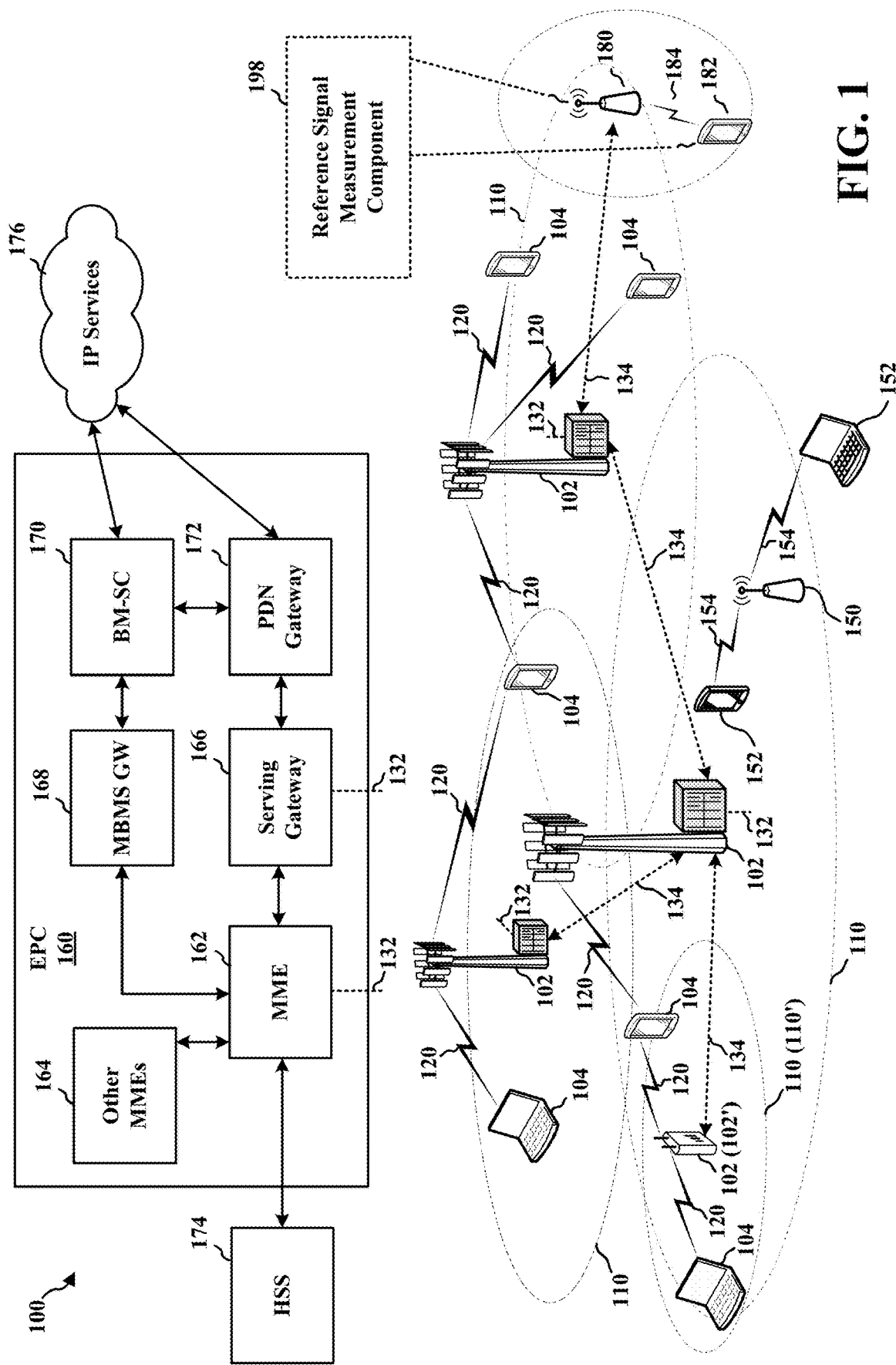
FIG. 1 is a diagram illustrating an example of a wireless communications system and an access network including at least one user equipment (UE) and network entity each including a reference signal measurement component.

The present aspects relate to reference signal (RS) measurements. Specifically, high path loss is a challenge in some wireless communication systems. As a result, new techniques such as hybrid beamforming (e.g., analog and digital) may be introduced to alleviate path loss. Hybrid beamforming creates narrow beam patterns to enhance link budget or signal-to-noise ratio (SNR).

A base station and a user equipment (UE) communicate over active beams. Active beams are base station and UE beam pairs that carry data and control channels such as physical downlink shared channel (PDSCH), physical downlink control channel (PDCCH), physical uplink shared channel (PUSCH), and physical uplink shared channel (PUCCH). The base station, e.g., a serving base station, may need to monitor the beam pairs as well as beams from neighboring cells using beam measurements and feedback procedures.

The serving base station may monitor active beams from one or more neighboring base stations (e.g., transmit-receive points (TRPs) or evolved Node Bs (eNBs)) using measurements of RS signals (examples include new radio synchronization signals (NR-SS), mobility reference signals (MRS), channel state information reference signals (CSI-RS), or demodulation reference signals (DMRS), etc.). RS signals or transmissions from one or more base stations may have a certain pattern in time/frequency (e.g., periodic or burst transmission). The serving base station may send a measurement request to the UE. Due to analog beamforming and/or radio frequency (RF) chain constraints, the UE may have to tune or beamform to a different direction and/or use all RF chains for measurements. During this period, the serving base station may not be able to allocate resources to the UE, resulting in lower throughput.

As such, the UE may beamform to obtain higher gains and perform the RS measurements of at least one target or neighboring base station using one or more RF chains according to a mask corresponding to a specific duration known to the serving base station. The mask, which may be determined and provided by the serving base station to the UE, or may be determined by the UE based on measurement reporting information, allows for the UE to use certain symbols defining a duration over which to perform RS measurements. Accordingly, the UE may, in some aspects, beamform and perform RS measurements of one or more target/neighboring base stations using a first subset of a set of RF chains while also communicating with the serving base station using a second subset of the set of RF chains during the period specified by the mask.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations or network entities 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for at least one respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station or network entity may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, one or both of the UE 182 and/or mmW base station 180 may include a reference signal measurement component 198, which may be configured to configure a mask for RS measurements, as further described herein with reference to FIGS. 2-10.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
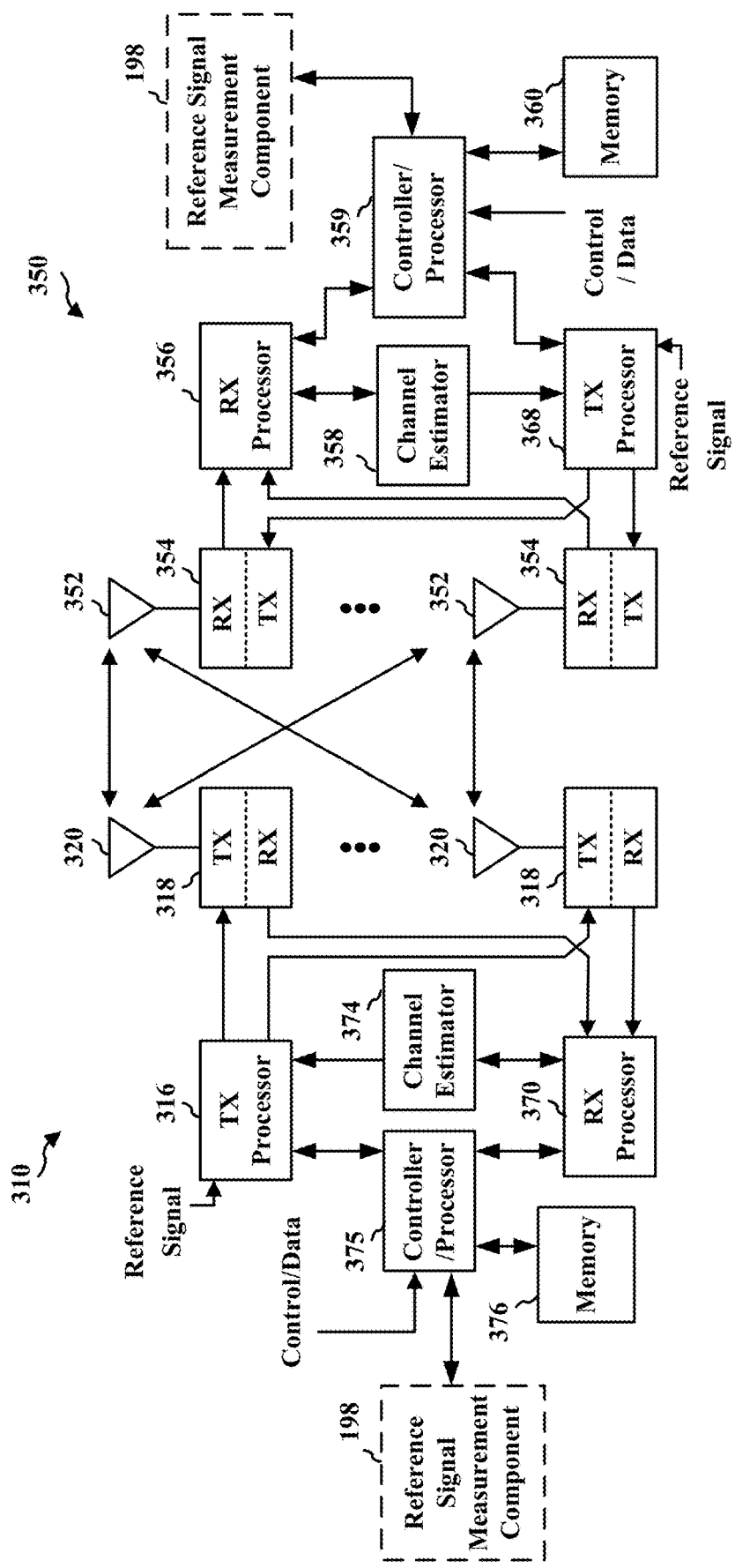
FIG. 3 is a diagram illustrating an example of a network entity such as an evolved Node B (eNB) and user equipment (UE) in an access network.

FIG. 3 is a block diagram of an eNB 310 in communication with a UE 350 in an access network. One or both of the eNB 310 and/or the UE 350 may include the reference signal measurement component 198, which may be configured to configure a mask for RS measurements. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
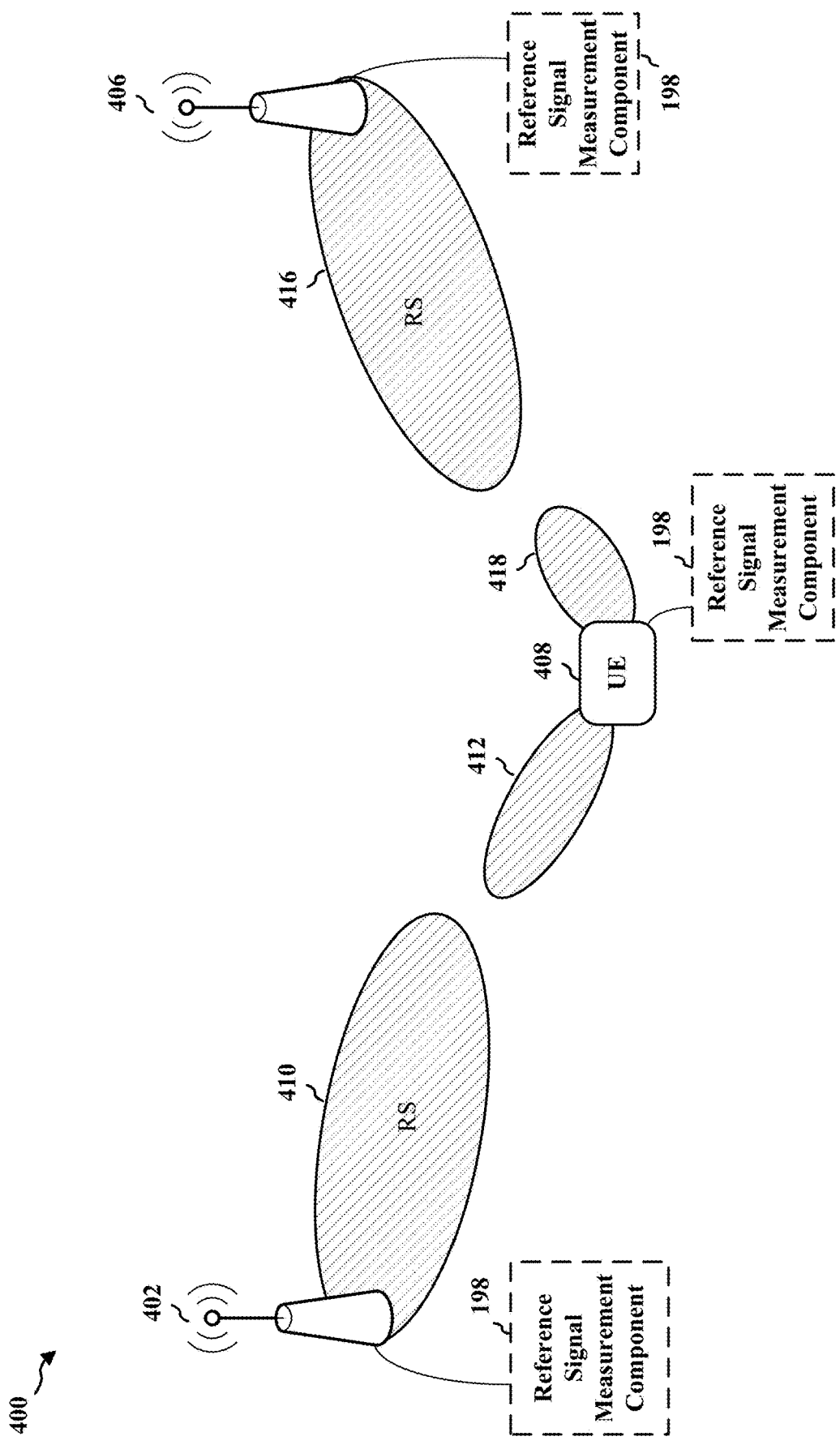
FIG. 4 is a diagram illustrating an example of mask for RS measurements within a wireless communication system.

FIG. 4 is a diagram illustrating an example of configuring a mask for RS measurements within a wireless communication system 400. In the example, the wireless communication system 400 includes two network entities and/or base stations 402 and 406, and a UE 408. In one configuration, each of the network entities 402 and 406 may be mmW base station. In one configuration, the network entity 402 may be the serving network entity of the UE 408, and the network entity 406 may be a neighboring base station. The UE 408 may include several RF chains, each of which may be composed by RF devices such as transmitters, receivers, cables, amplifiers, attenuator, measurement instruments, loads, etc.

The serving network entity 402 and the UE 408 may communicate over active beams 410 and 412. The serving network entity 402 may need to monitor the active beams 410 and 412, as well as beams from neighboring cells (e.g., beam 416) using beam measurements and feedback procedures.

Reference signals may be transmitted by the serving network entity 402 and/or the neighbor network entity (e.g., the base station 406) in a periodic or on-demand manner. The serving network entity 402 may send a measurement request to the UE 408 to perform RS measurements on the network entity 406. Due to analog beamforming and radio frequency (RF) chain constrains, the UE 408 may have to tune to a different direction (e.g., beam 418) and/or use all RF chains for RS measurements of the network entity 406. During this period, the serving network entity 402 may not be able to allocate resources to the UE 408, resulting in lower throughput.

In one configuration, the UE 408 may determine the presence of RSs transmitted from one or more network entities (e.g., the base station 406). For example, in some cases, the UE 408 may measure NR-SS from the network entity 406 and determine the location of RS in SFN, subframe index (SFI), slot/mini-slot, tones, etc. In other words, the UE 408 may determine RS configuration autonomously.

In one configuration, the serving network entity 402 may provide configuration information for RSs transmitted from one or more network entities (e.g., the base stations 402, 406). The one or more network entities may constitute serving network entity 402 and neighboring network entity 406. For example, the serving network entity 402 may provide SFN, SFI, slots/mini-slots, RE where the RS is transmitted from the one or more network entities.

In one configuration, base stations may coordinate the transmission of reference signals, for example, by exchanging information about the transmission of RS (e.g., SFN, SFI, mini-slots/slots, tones, etc.).

Some wireless communication systems may experience high path loss. To alleviate path loss, beamforming may be utilized to create narrow beam patterns to enhance link budget or SNR (e.g., in the case of hybrid beamforming). However, due to analog beamforming and radio frequency (RF) chain constraints, the UE may have to tune or beamform to a different direction and/or use all RF chains for measurements. During this period, the serving base station may not be able to allocate resources to the UE, resulting in lower throughput. As such, to address such problems, RS may be transmitted by serving/neighbor TRP/NBs in a periodic or on demand manner. For example, a mask corresponding to one or more consecutive or non-consecutive symbols during which the UE may use one or more RF chains to beamform and perform RS measurements may be determined by or otherwise provided to the UE and also known by the serving base station. The mask may obviate the need for the UE to use all RF chains for a period of time unknown to the serving base station as the mask may not only define the duration the UE may perform the RS measurements, but also one or more RF chains for performing such measurements.

A mask for RS measurements may be a duration of time (e.g., SFN, SFI, mini-slots/slots, etc.) during which the UE 408 may beamform and/or tune away one or more RF chains from the serving network entity 402 in one or more directions to perform RS measurements of a neighboring network entity (e.g., the base station 406). In some cases, the duration, or mask, may be determined based on information indicating one or more RS transmission patterns received from one or more network entities. According to aspects, the information indicating the one or more RS transmission patterns may be pre-configured or exchanged over backhaul links.

In some cases, the duration may be determined, for example, by the serving network entity 402, based on the prior measurement reports received from the UE 408. For example, the prior measurement reports received from the UE 408 may include information such as a beam identifier (e.g., beam 0, beam 1, etc.), a NodeB identifier, and reference signal received power (RSRP) associated with the beam identified by the beam identifier. According to aspects, the beam identifier (e.g., beam 0, beam 1, etc.) may be a logical mapping to SFN, SFI, slot/mini-slot, or the like. According to some aspects, the serving network entity 402 may use the prior measurement reports to determine the RS measurement mask or duration. For example, the UE 408 may have reported a number of beams (e.g., beams 0 and 8), and/or a number of beams the UE 408 was able to measure. Thus, the time at which beams 0 and 8 occur with respect the target may be known to the serving network entity 402. That is, the measurement reports received by the serving network entity 402 provide or otherwise include a level of granularity in the form of a symbol (e.g., which specifies time) to beam mapping. In turn, the serving network entity 402 may use the measurement reports to determine the mask by indicating which of the symbols identified by the UE 408 should be used for RS measurements of at least the target. As such, both the serving network entity 402 and the UE 408 may be aware of such masks or durations (e.g., as defined by the SF number, slot, and symbol information).

According to aspects, based on the measurement report received from the UE 408, the serving network entity 402 may explicitly send signaling, such as a configuration message, to the UE 408 specifying the duration during which the UE 408 may tune/beamform away one or more of the UE's RF chains in one or more directions (e.g., the beam 418) to perform RS measurements of a neighboring network entity (e.g., the base station 406). In one configuration, the number of RF chains and the direction to tune may be specified by the serving network entity 402, for example, in the configuration message. In some cases, the serving network entity 402 may also specify a beam direction not to measure during the RS measurement duration.

In some cases, based on the measurement report, both the serving network entity 402 and the UE 408 may each implicitly and/or separately assume the duration over which the UE 408 may beamform and/or tune away one or more of the UE's RF chains in one or more direction for RS measurements of a neighboring network entity (e.g., the base station 406). According to aspects, the number of RF chains to beamform and/or tune away during the RS measurements may be specified using PBCH, L1/L2 or RRC configuration. For example, the serving network entity 402 may configure the UE 408 with the specific RF chains that the UE 408 should beamform and/or tune away from during the RS measurements, for example, using a message transmitted on the PBCH, L1/L2 messages, and/or RRC configuration messages.

In some cases, the serving network entity 402 may obtain feedback from the UE 408 indicating RS measurement capability associated with the UE 408, for example, indicating RF-chain limitations, rank limitations, etc. at the UE. According to aspects, the UE 408 may transmit the feedback dynamically (e.g., over time) or as a one-time one time transmission.

For example, in some cases, the UE 408 may send a one-time transmission to the serving network entity 402 containing contain UE capability information. Additionally, the UE 408 may dynamically transmit the feedback to the serving network entity 402 by including the feedback in one or more measurement reports associated with differing beams, each of which may contain sub-array information of the UE 408 indicating which beams associated with one or more sub-arrays can and cannot be used simultaneously to perform measurements. In some aspects, a sub-array may be an antenna panel including a set of antenna elements used to form a beam in one or more directions.

In some cases, the UE 408 may beamform and/or tune away one or more of its sub-array to target a neighboring base station at the specified duration (e.g., specified according to SFN, SFI, slot/mini-slot). In one configuration, the serving network entity 402 may continue to communicate with the UE 408 during the duration. In such a configuration, the serving network entity 402 may schedule the UE 408 based on the rank/layer limitation. In one configuration, the serving network entity 402 may terminate the measurement gap (e.g., the duration/mask) earlier by sending a signal to the UE 408 when the UE 408 uses a subset of RF chains for communication with the serving network entity 402.

For example, in some aspects, the UE 408 may include two or more RF chains. The first RF chain of the UE 408 may, in some cases, be used to perform RS measurements while the second RF chain of the UE 408 may be used to transmit and/or receive data (e.g., has connectivity to the network) during a specified time (e.g., a number of consecutive or non-consecutive symbols) specified by the mask. In some instances, the UE 408 may beamform, obtain and indicate to the serving network entity 402, the RS measurements before the duration or mask has elapsed. Upon receiving the indication, the network may have the flexibility to terminate the measurements prior to an end of the duration and use the first RF chain for transmission/reception of data with the network. For instance, the serving network entity 402 may send a termination indication in the form of downlink control information (DCI) or a MAC control element (CE). Early termination may thus provide improved data rates by permitting the UE to use the RF chain that was initially allocated for RS measurements for data communication instead. Additionally or alternatively, power may be conserved as the UE may forgo performing additional measurements during the mask in response to early termination.

Figure 5:
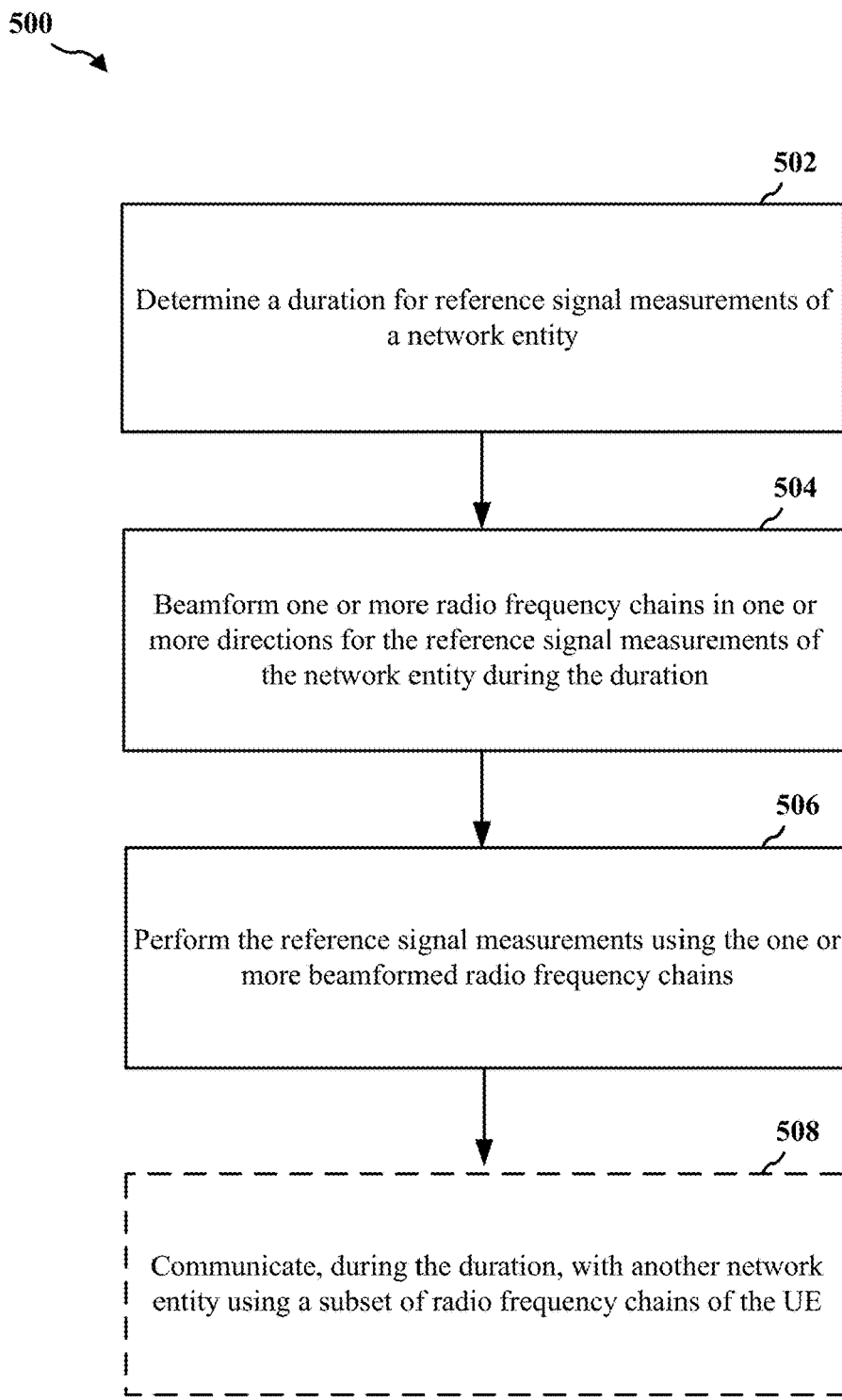
FIG. 5 is a flowchart of a method of wireless communication at a UE in accordance with one or more aspects described herein.

FIG. 5 is a flowchart illustrating example operations 500 for wireless communication, according to certain aspects of the present disclosure. According to aspects, operations 500 may be performed, in some cases, by a UE (e.g., the UE 182, 350, 408, or the apparatus 602) including reference signal measurement component 198. According to aspects, operations 500 provide for early termination of RS measurements such that RF resources used by these measurements may be used for transmission/reception of data. The operations 500 provide improved data rate and enhanced user experience.

Operations 500 begin at 502 determining a duration for reference signal measurements of a network entity (e.g., the base station 406). In some aspects, the reference signal measurements may include one or more of a received signal strength indicator (RSSI), reference signal received power (RSRP), and/or an interference measurement such as signal-to-noise radio (SNR). In some aspects, the network entity may be a target network entity.

In some cases, the duration may be defined by one or more of SFN, SFI, slot, or mini-slot. Additionally, in some cases, the duration may be determined based on a reference signal transmission pattern from the target network entity (e.g., target NodeB). In some aspects, the reference signal transmission pattern may be a distinct pattern at a given point in time (e.g., time dependent) and may be known by the target network entity. In some cases, the reference signal transmission pattern may be received from a serving network entity. In other cases, the reference signal transmission pattern may be determined by the UE by measuring NR-SS from the target network entity. In one configuration, the duration may be determined based on a configuration message received from the serving network entity, for example, as described above.

At 504, the UE beamforms one or more radio frequency chains in one or more directions for performing the reference signal measurements of the target network entity during the determined duration. In some cases, the UE may further receive, from the serving network entity, the number of radio frequency chains to beamform or tune away and/or the one or more directions to tune to. In some cases, the number of radio frequency chains to beamform and/or tune away and the one or more directions to tune to may be specified using PBCH, L1/L2, or RRC configuration information. In one configuration, the UE may further receive, from the serving network entity, a direction not to perform the RS measurements in during the duration.

At 506, the UE may perform the reference signal measurements using the one or more beamformed radio frequency chains. For example, the UE may perform the measurements of at least one of a serving network entity or target network entity according to the duration specifying one or more consecutive or non-consecutive symbols.

At 508, the UE may optionally communicate, during the duration, with the serving network entity using a subset of radio frequency chains of the UE. In some cases, the UE may further receive a signal from the serving network entity to terminate the reference signal measurements before the duration expires. For example, the UE may communicate, during the duration with another network entity, such as the serving network entity In some aspects, although not shown in FIG. 5, the UE may perform early termination upon completion of the reference signal measurements. In some aspects, the early termination may be before the duration. For example, to perform early termination, the UE may transmit an indication to the network entity (one of network entity 402 or 406) notifying of a completion of the reference signal measurements. The indication may trigger the network entity to begin scheduling transmissions over one or both radio frequency chains.

Figure 6:
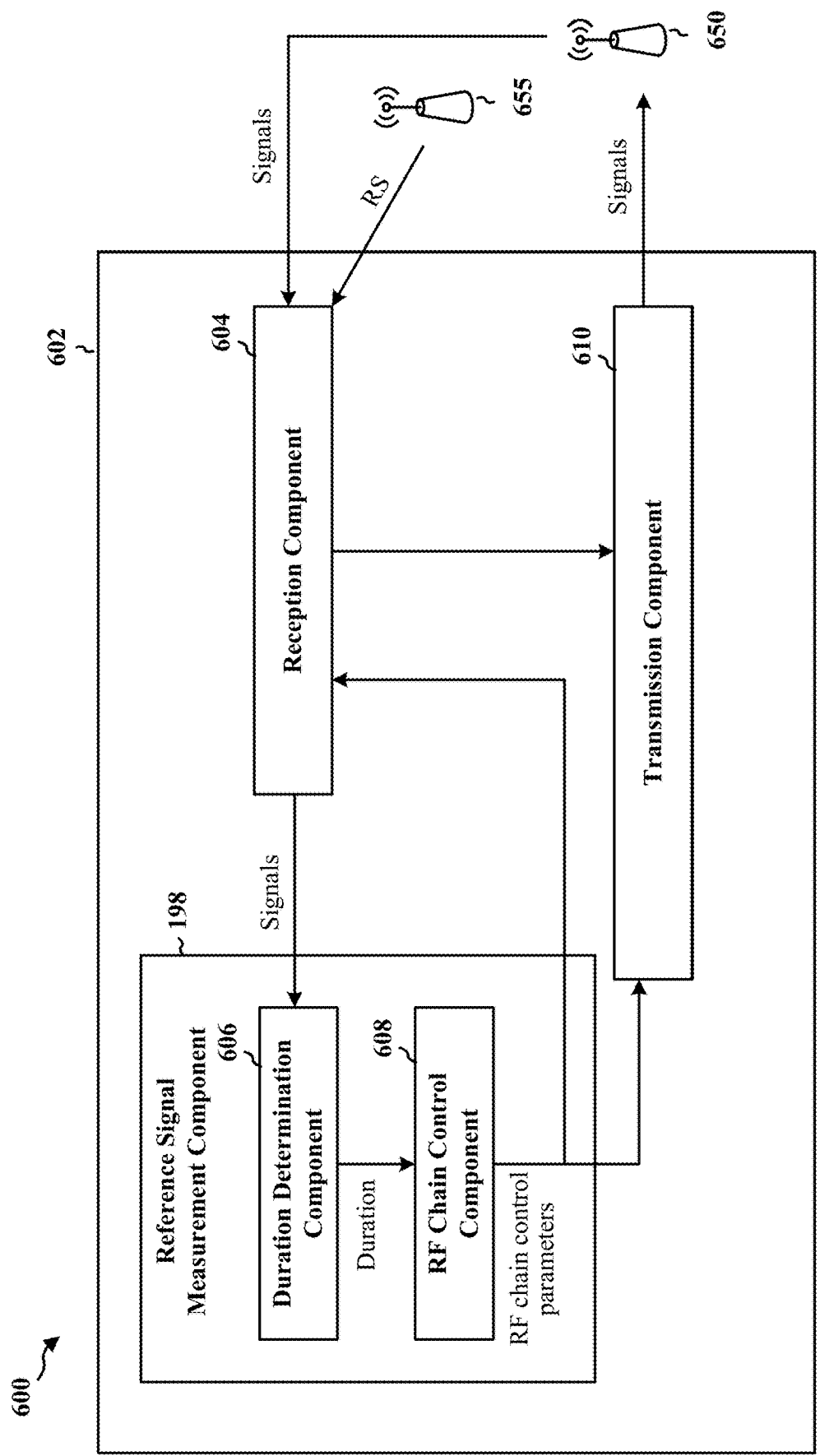
FIG. 6 is a conceptual data flow diagram illustrating the data flow between different means/components in an exemplary apparatus, for example, according to FIG. 5.

FIG. 6 is a conceptual data flow diagram 600 illustrating the data flow between different means/components in an exemplary apparatus 602. The apparatus may be a UE such as UE 408. The apparatus 602 may include a reception component 604 configured to receive a signal from a serving base station 650. The reception component 604 may also be configured to receive RSs from a neighboring base station 655.

The apparatus 602 may include a transmission component 610 configured to transmit signals to the serving base station 650. The reception component 604 and the transmission component 610 may operate in conjunction to coordinate the communications of the apparatus 602.

The apparatus 602 may include a duration determination component 606 configured to determine a duration over which the apparatus 602 may beamform and/or tune away one or more RF chains in one or more directions for the reference signal measurements of the network entity or base station 655. In one configuration, the duration determination component 606 may be configured to perform the operations described above with reference to 504 in FIG. 5.

The apparatus 602 may include an RF chain control component 608 configured to beamform or tune away one or more RF chains in one or more directions for the reference signal measurements of the base station 655. In one configuration, the RF chain control component 608 may also configure the apparatus 602 to communicate with the serving base station 650 using a subset of RF chains during the duration. In one configuration, the RF chain control component 608 may perform the operations described above with reference to 504 or 506 in FIG. 5.

The apparatus may include additional components configured to perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
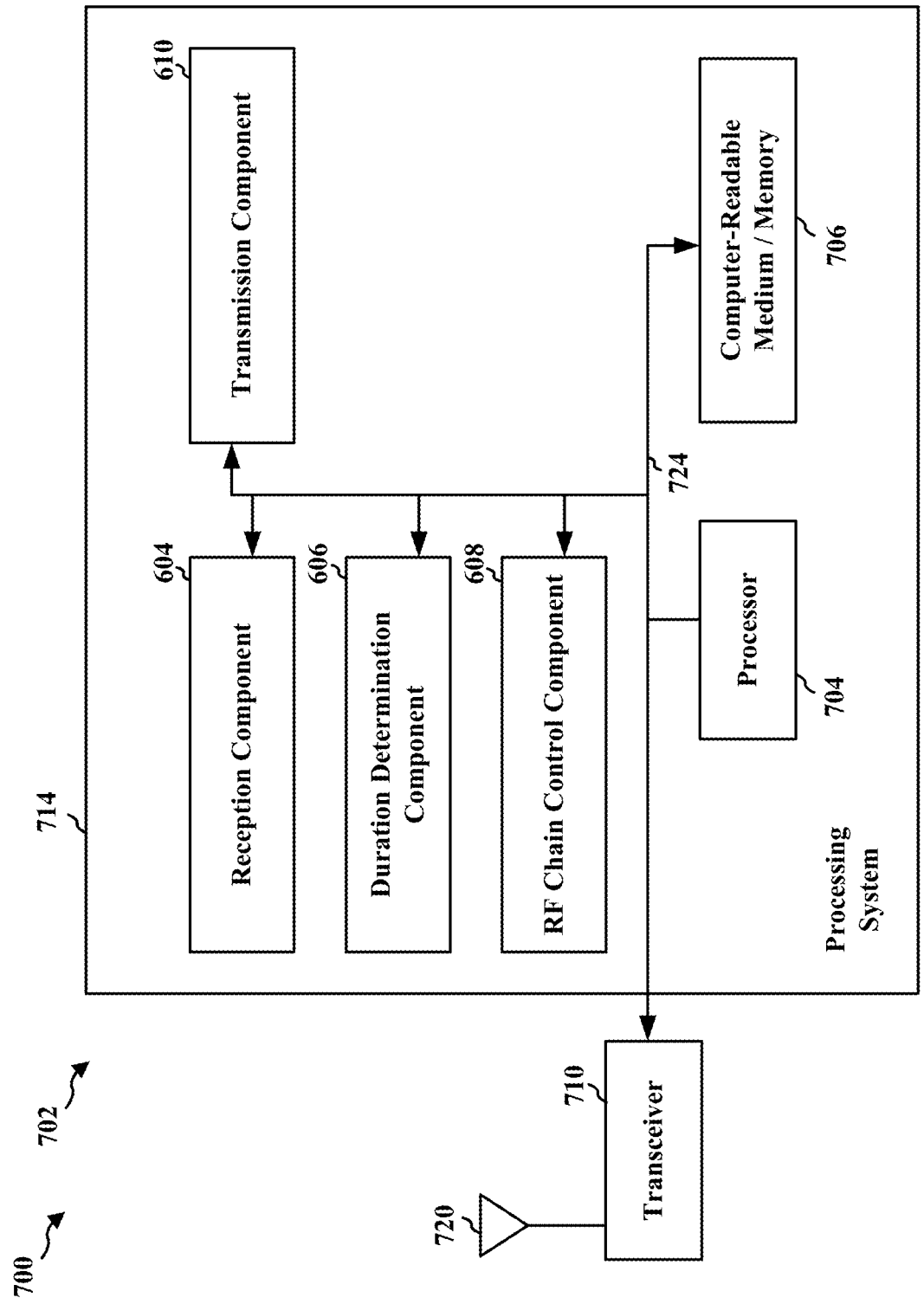
FIG. 7 is a diagram illustrating an example of a hardware implementation for an apparatus employing a processing system, for example, according to FIG. 5.

FIG. 7 is a diagram 700 illustrating an example of a hardware implementation for an apparatus 702 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, and the computer-readable medium/memory 706. The bus 724 may also link various other circuits such as timing sources, peripherals, voltage regulators, and power management circuits, which are well known in the art, and therefore, will not be described any further.

The processing system 714 may be coupled with a transceiver 710. The transceiver 710 is coupled with one or more antennas 720. The transceiver 710 enables, at least in part, communication with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled with a computer-readable medium/memory 706. The processor 704 is responsible for processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In one configuration, the apparatus 602/702 for wireless communication may include means (e.g., duration determination component 606) for determining a duration for reference signal measurements of a target network entity. In one configuration, the apparatus 602/702 may include means (e.g., RF chain control component 608) for beamforming or tuning away one or more radio frequency chains in one or more directions for the reference signal measurements of the target network entity during the duration. In one configuration, the apparatus 602/702 may include means (e.g., reception component 604 and/or transmission component 610) for communicating with another network entity (e.g., serving base station) using a subset of radio frequency chains of the UE during the duration. In one configuration, the apparatus 602/702 may include means (e.g., reception component 604 and/or transmission component 610) for performing the reference signal measurements using the one or more beamformed radio frequency chains.

In one configuration, the apparatus 602/702 may include means (e.g., reception component 604) for receiving the number of radio frequency chains to beamform or tune away and the one or more directions. In one configuration, the apparatus 602/702 may include means (e.g., reception component 604) for receiving a direction not to measure during the duration. In one configuration, the apparatus 602/702 may include means (e.g., reception component 604) for receiving a signal from the serving network entity to terminate the reference signal measurements before the duration expires.

The aforementioned means may be one or more of the aforementioned components of the apparatus 602 and/or the processing system 714 of the apparatus 702 configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
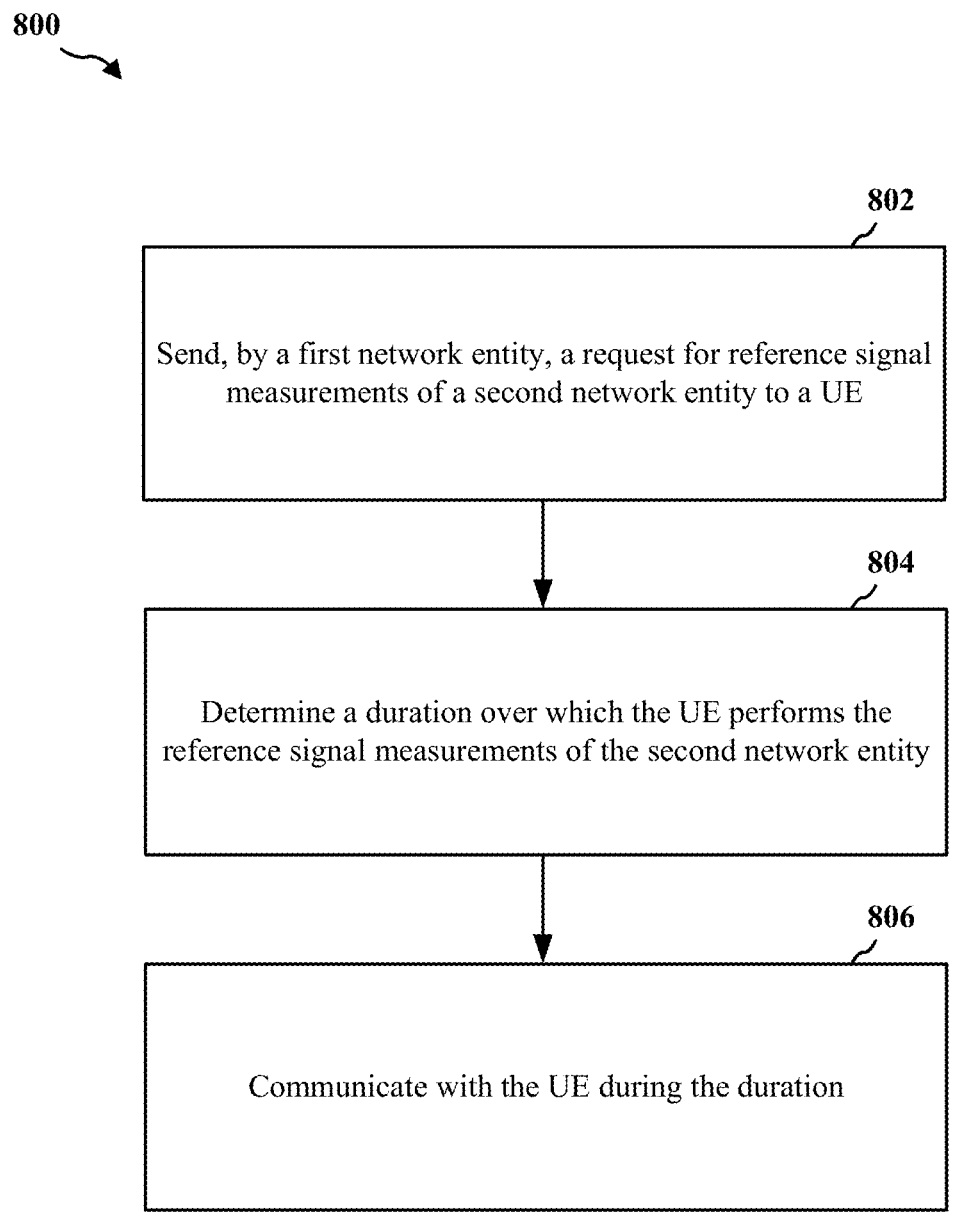
FIG. 8 is a flowchart of a method of wireless communication at a network entity in accordance with one or more aspects described herein.

FIG. 8 is a flowchart 800 of a method of wireless communication. The method may be performed by a first base station (e.g., the base station 180, 310, 402, or the apparatus 902/902') including reference signal measurement component 198. At 802, the first network entity (e.g., the base station 402) may send a request for reference signal measurements of a second network entity (e.g., the base station 406) to a UE (e.g., the UE 408). In some aspects, the reference signal measurements may include one or more of a received signal strength indicator (RSSI), reference signal received power (RSRP), and/or an interference measurement such as signal-to-noise radio (SNR).

At 804, the first network entity may determine a duration over which the UE performs the reference signal measurements of the second network entity. In some cases, the duration may be defined by one or more of SFN, SFI, slot, or mini-slot. In other cases, the duration may be determined based on a reference signal transmission pattern from the second network entity. Additionally, in some cases, the duration may be determined based on a measurement report from the UE.

According to aspects, the first network entity may further send a configuration message to the UE specifying the duration. Additionally, the first network entity may further send to the UE the number of radio frequency chains to beamform or tune away and/or one or more directions to tune to for the reference signal measurements of the second network entity. In such a case, the number of radio frequency chains to beamform or tune away and the one or more directions to tune to may be specified using PBCH, L1/L2, or RRC configuration information. Additionally, in some cases, the first network entity may further send to the UE information indicating one or more directions not to perform the RS measurements during the duration.

At 806, the first network entity may communicate with the UE during the duration. According to aspects, the communicating with the UE may be through a subset of radio frequency chains of the UE. Additionally, in some cases, the first network entity may further transmit a signal to the UE to terminate the reference signal measurements before the duration expires. For example, the first network entity may send a termination indication in the form of DCI and/or a MAC control element in response to receiving the RS measurements from the UE prior to an expiration or elapsing of the duration as defined by the mask. The UE may, upon receiving the termination indication, allocate or use the RF chain previously used for RS measurements for transmission/reception of data. Early termination may thus provide improved data rates and enhanced power conservation by permitting the UE to use the RF chains that were initially allocated for RS measurements for data communication instead.

Figure 9:
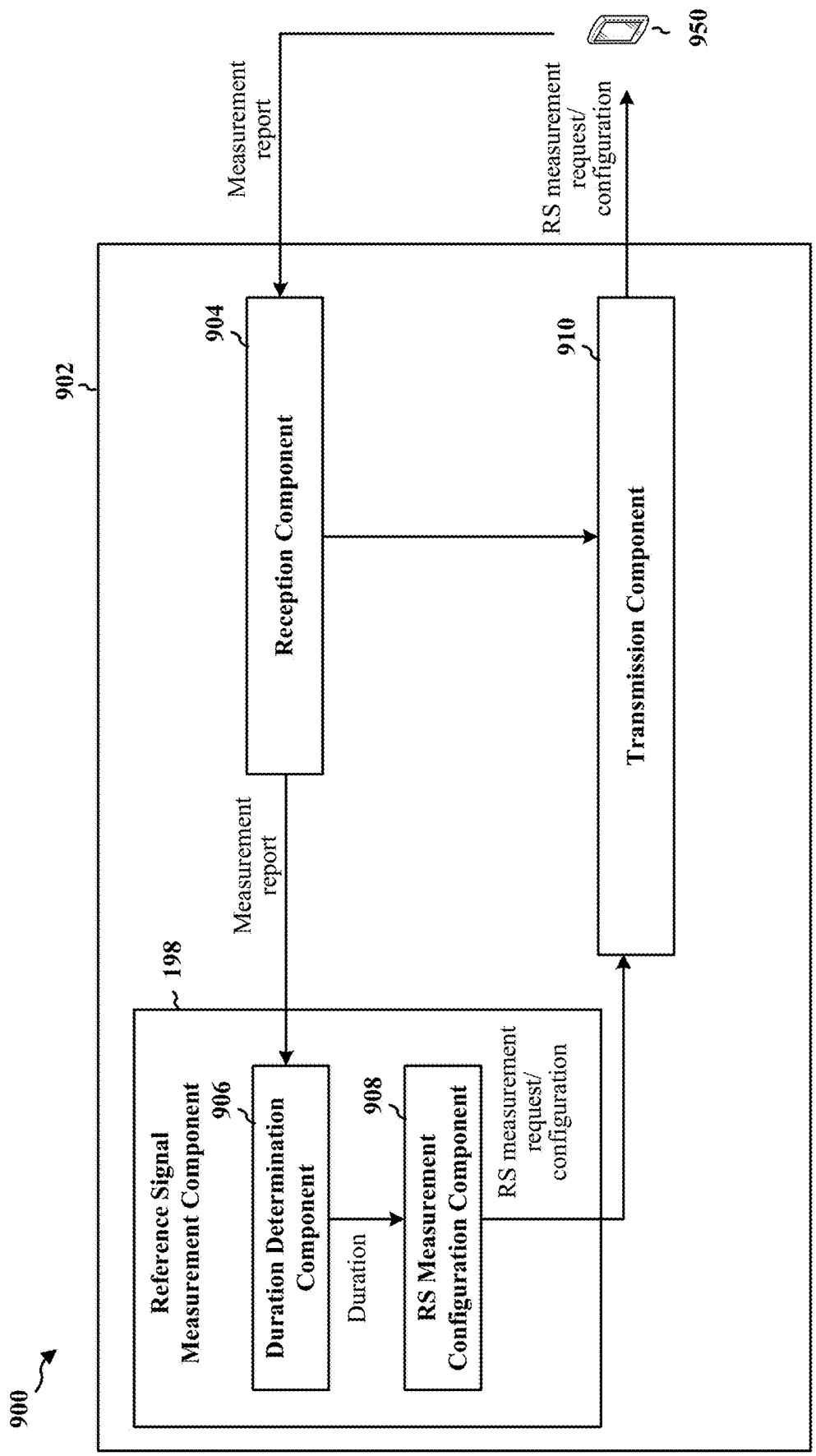
FIG. 9 is a conceptual data flow diagram illustrating the data flow between different means/components in an exemplary apparatus, for example, according to FIG. 8.

FIG. 9 is a conceptual data flow diagram 900 illustrating the data flow between different means/components in an exemplary apparatus 902. The apparatus 902 may be a base station. The apparatus 902 may include a reception component 904 that receives measurement reports from a UE 950. The apparatus 902 may include a transmission component 910 that transmits RS measurement request and/or configuration to the UE 950. The reception component 904 and the transmission component 910 may work in concert to coordinate the communications of the apparatus 902.

The apparatus 902 may include a duration determination component 906 that determines a duration over which the UE 950 may beamform or tune away one or more RF chains in one or more directions for the reference signal measurements of a neighboring base station. In one configuration, the duration determination component 906 may receive the measurement report from the reception component 904 and determine the duration based on the measurement report. In one configuration, the duration determination component 906 may perform the operations described above with reference to 804 in FIG. 8.

The apparatus 902 may include a RS measurement configuration component 908 that generates RS measurement request and configuration. The configuration may include the duration, the number of RF chains to beamform and/or tune away, or the one or more directions to tune to.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
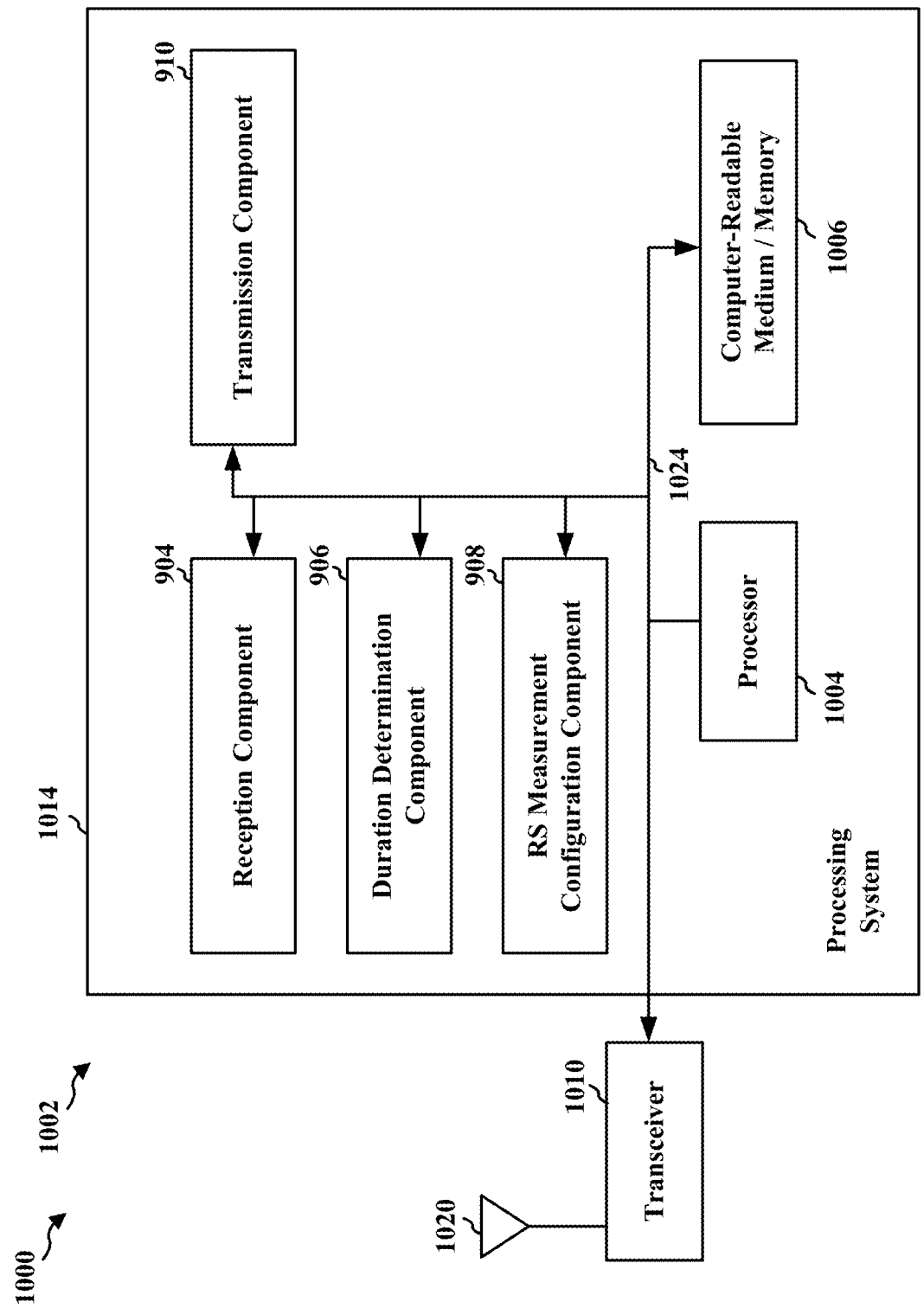
FIG. 10 is a diagram illustrating an example of a hardware implementation for an apparatus employing a processing system, for example, according to FIG. 8.

FIG. 10 is a diagram 1000 illustrating an example of a hardware implementation for an apparatus 1002 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910. The components may be software components running in the processor 1004, resident/stored in the computer readable medium/memory 1006, one or more hardware components coupled to the processor 1004, or some combination thereof. The processing system 1014 may be a component of the eNB 310 and may include the memory 376 and/or at least one of the TX processor 316, the RX processor 370, and the controller/processor 375

In one configuration, the apparatus 902/1002 for wireless communication may include means for sending a request for reference signal measurements of a second network entity to a UE. In one configuration, the apparatus 902/1002 may include means for determining a duration over which the UE performs the reference signal measurements of the second network entity. In one configuration, the apparatus 902/1002 may include means for communicating with the UE during the duration.

In one configuration, the apparatus 902/1002 may include means for sending a configuration message to the UE specifying the duration. In one configuration, the apparatus 902/1002 may include means for sending to the UE a number of radio frequency chains to beamform or tune away and one or more directions to tune to for the reference signal measurements of the second network entity. In one configuration, the apparatus 902/1002 may include means for sending to the UE a direction not to measure during the duration. In one configuration, the apparatus 902/1002 may include means for transmitting a signal to the UE to terminate the reference signal measurements before the duration expires.

The aforementioned means may be one or more of the aforementioned components of the apparatus 902 and/or the processing system 1014 of the apparatus 1002 configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
    determining a duration for reference signal measurements of a network entity; and
    beamforming a first subset of radio frequency chains of a set of radio frequency chains in one or more directions for the reference signal measurements of the network entity during the duration;
    performing the reference signal measurements of the network entity using the beamformed first subset of radio frequency chains; and
    communicating data with a serving entity using a second subset of radio frequency chains of the set of radio frequency chains during the duration.

2. The method of claim 1, wherein the duration is determined based on a configuration message received from the serving network entity.

3. The method of claim 1, wherein the duration is determined based on a reference signal transmission pattern from the network entity.

4. The method of claim 3, wherein the reference signal transmission pattern is determined by measuring new radio synchronization signal (NR-SS) from the network entity.

5. The method of claim 1, further comprising receiving, from the serving network entity, a number of radio frequency chains to beamform and the one or more directions to perform the reference signal measurements.

6. The method of claim 5, wherein the number of radio frequency chains to beamform is determined based on at least one of physical broadcast channel (PBCH), L1/L2, or radio resource control (RRC) configuration information received from the other network entity.

7. The method of claim 1, further comprising receiving, from the serving network entity, a direction not to perform the reference signal measurements during the duration.

8. The method of claim 1, wherein the duration is determined based on one or more of a system frame number (SFN), a subframe index (SFI), a slot, or a mini-slot.

9. The method of claim 1, further comprising receiving a signal from the serving network entity to terminate the reference signal measurements early before the duration expires.

10. An apparatus for wireless communication, the apparatus being a user equipment (UE), comprising:
    means for determining a duration for reference signal measurements of a network entity; and
    means for beamforming a first subset of radio frequency chains of a set of radio frequency chains in one or more directions for the reference signal measurements of the network entity during the duration;
    means for performing the reference signal measurements of the network entity using the beamformed first subset of radio frequency chains; and
    means for communicating data with a serving network entity using a second subset of radio frequency chains of the set of radio frequency chains during the duration.

11. The apparatus of claim 10, wherein the duration is determined based on a configuration message received from the serving network entity.

12. The apparatus of claim 10, wherein the duration is determined based on a reference signal transmission pattern from the network entity.

13. The apparatus of claim 12, wherein the reference signal transmission pattern is determined by measuring new radio synchronization signal (NR-SS) from the network entity.

14. The apparatus of claim 10, further comprising receiving, from the serving network entity, a number of radio frequency chains to beamform and the one or more directions to perform the reference signal measurements.

15. A non-transitory computer-readable medium storing computer executable code, comprising code to:
    determine a duration for reference signal measurements of a network entity; and
    beamform a first subset of radio frequency chains of a set of radio frequency chains in one or more directions for the reference signal measurements of a different network entity during the duration;
    perform the reference signal measurements of the different network entity using the beamformed first subset of radio frequency chains; and
    communicate data with the network entity using a second subset of radio frequency chains of the set of radio frequency chains during the duration.

16. The non-transitory computer-readable medium of claim 15, wherein the duration is determined based on a configuration message received from the serving network entity.

17. The non-transitory computer-readable medium of claim 15, wherein the duration is determined based on a reference signal transmission pattern from the network entity.

18. The non-transitory computer-readable medium of claim 17, wherein the reference signal transmission pattern is determined by measuring new radio synchronization signal (NR-SS) from the network entity.

19. The non-transitory computer-readable medium of claim 15, further comprising receiving, from serving network entity, a number of radio frequency chains to beamform and the one or more directions to perform the reference signal measurements.

20. An apparatus for wireless communication, the apparatus being a user equipment (UE), comprising:
    a memory; and
    at least one processor coupled with the memory and configured to:
        determine a duration for reference signal measurements of a network entity; and
        beamform a first subset of radio frequency chains of a set of radio frequency chains in one or more directions for the reference signal measurements of a different network entity during the duration;
        perform the reference signal measurements of the different network entity using the beamformed first subset of radio frequency chains; and
        communicate data with a serving network entity using a second subset of radio frequency chains of the set of radio frequency chains during the duration.

21. The apparatus of claim 20, wherein the duration is determined based on a configuration message received from the serving network entity.

22. The apparatus of claim 20, wherein the duration is determined based on a reference signal transmission pattern from the network entity.

23. The apparatus of claim 22, wherein the reference signal transmission pattern is determined by measuring new radio synchronization signal (NR-SS) from the network entity.

24. The apparatus of claim 20, wherein the at least one processor is further configured to receive, from the serving network entity, a number of radio frequency chains to beamform and the one or more directions to perform the reference signal measurements.

25. The apparatus of claim 24, wherein the number of radio frequency chains to beamform is determined based on at least one of physical broadcast channel (PBCH), L1/L2, or radio resource control (RRC) configuration information received from the other network entity.

26. The apparatus of claim 20, wherein the at least one processor is further configured to receive, from the serving network entity, a direction not to perform the reference signal measurements during the duration.

27. The apparatus of claim 20, wherein the duration is defined by one or more of a system frame number (SFN), a subframe index (SFI), a slot, or a mini-slot.

28. The apparatus of claim 20, wherein the at least one processor is further configured to receive a signal from the serving network entity to terminate the reference signal measurements before the duration expires.

* * * * *